UNITED STATES PATENT OFFICE.

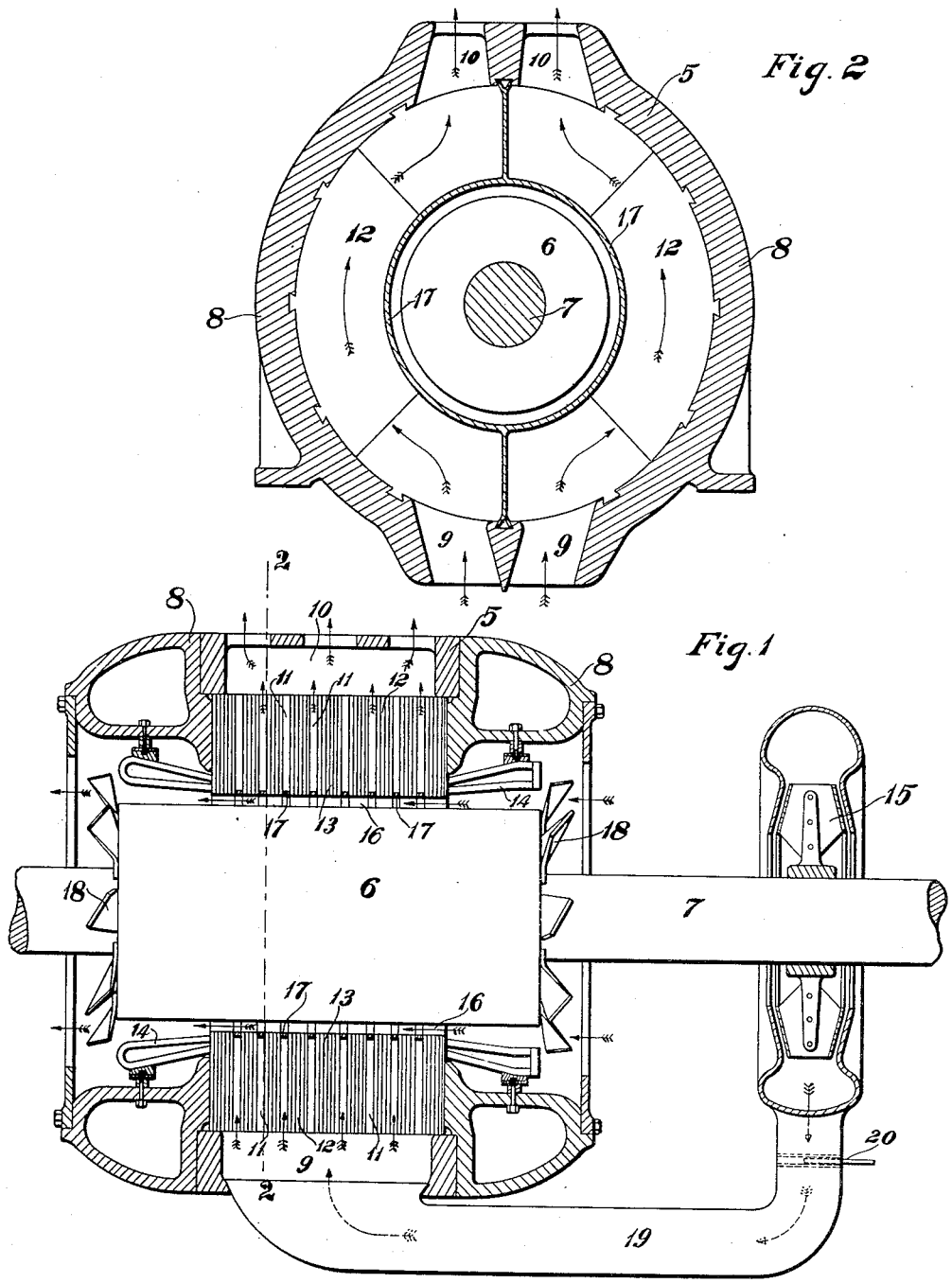

CHARLES E. LORD, OF NORWOOD, OHIO, ASSIGNOR TO THE BULLOCK ELECTRIC MANUFACTURING COMPANY, A CORPORATION OF OHIO.

TURBO-ALTERNATOR.

No. 879,564.    Specification of Letters Patent.    Patented Feb. 18, 1908.

Application filed June 7, 1905. Serial No. 264,159

*To all whom it may concern:*

Be it known that I, CHARLES E. LORD, a citizen of the United States, residing at Norwood, in the county of Hamilton and State of Ohio, have invented certain new and useful Improvements in Turbo-Alternators, of which the following is a full, clear, and exact specification.

My present invention relates to improvements in the construction of dynamo-electric machines, particularly to the means for ventilating high-speed machines such as turbo-generators.

In the types of dynamo-electric machines most commonly employed at the present time, the rotatable member is provided with axial and radial passageways, and the stationary member is provided with radial passage-ways through its core between its windings, the passage-ways in the stationary windings being in radial alinement with the radial passage-ways of the rotatable member. When such a machine is in operation, the air enters the rotatable member through said axial passage-ways, thence flows through the radial passage-ways of said member into the air-gap of the machine, from which it flows through the passage-ways of the stationary member and out of the machine through openings in the periphery of its frame or yoke. When this construction is applied to high-speed machines, and particularly to turbo-generators in which the rotatable member has a comparatively small diameter, it is practically impossible to force enough air radially across the air-gap to ventilate the machine properly.

The object of my invention is to construct and arrange a dynamo-electric machine and the ventilating passage-ways thereof, so that sufficient air to ventilate all parts may be readily supplied to the machine and the noise due to the flow of air may be reduced to a minimum.

The invention herein illustrated and described is a modification of that covered by my co-pending application Serial No. 264,158, filed June 7, 1905, and consists of a dynamo-electric machine having a stationary and a rotatable member, and means for ventilating said members comprising means for supplying a blast of air to the stationary member and means for supplying an independent blast of air to the rotatable member, the machine being preferably constructed so that the blast of air for the rotatable member does not reënter the machine after passing through the air-gap.

The invention also consists of more specific improvements in the construction and arrangement of the machine which will be hereinafter described and more particularly pointed out in the appended claims.

Referring now to the accompanying drawings which illustrate the preferred embodiment of my invention, Figure 1 is a longitudinal section of a dynamo-electric machine constructed in accordance with my invention; and Fig. 2 is a section on the line 2—2 of Fig. 1.

In the drawings the stationary member, or armature is indicated by 5 and has mounted within it the rotatable member or field magnet 6 on the shaft 7. It will of course be understood that the armature may become the rotatable member and the field magnet may become the stationary member without departing from the spirit of the invention. The stationary member comprises the frame 8 in which are formed passage-ways 9 and 10, communicating with the passage-ways 11 formed between the grouped laminations 12 of the core 13. Said core supports in any desired manner the windings 14. The passage-ways 11 are arranged substantially concentrically about the axis of the rotatable member 6 and are supplied with a blast of air at comparatively low pressure and large volume from a regulable source external to the machine, such as the blower 15 which may be mounted directly upon shaft 7 as shown in Fig. 1, or may be driven entirely independently of the machine. The volume of air is regulated by means such as the valve 20. To confine the blast of air to the stationary member and to prevent same from entering the air-gap 16 of the machine, and also to prevent the air in said air-gap from flowing between the windings of the stationary member and entering the passage-ways in the latter, I provide the separating strips 17 which may be in the form of parallel strips in the stationary member concentrically arranged about the axis of the rotatable member or may be in the form of plugs between the windings of said stationary member.

To ventilate the rotatable member I supply an axial blast of air to its periphery. Although any desired means may be employed for this purpose it is preferably accomplished by the angularly arranged fan-blades 18 mounted upon the ends of the rotatable member and forcing a blast of air through the air-gap in a direction substantially parallel to the axis of the rotatable member.

In the operation of the machine the air for cooling the armature or stationary member flows from the blower 15 through the pipe 19 into the passage-ways 9 at the periphery of the machine, thence through passage-ways 11 as indicated by the arrows, Fig. 2, concentrically about the rotatable member, but not in contact therewith, and out at the periphery of the machine through passage-ways 10. An independent current of air which does not mingle in any way with said blast through the armature is forced axially over the periphery of the rotatable member by the fan blades 18. The machine is so constructed that this blast of air does not re-enter the machine after passing through the air-gap.

By the ventilating arrangement just described I reduce the noise which usually accompanies the operation of high-speed generators, eliminate the objectionable and unsatisfactory radial movement of the ventilating currents of air across the air-gap of the machine, and obtain an easily regulable blast of air of large volume and relatively low velocity through the parts of the machine which tend to heat the most rapidly.

In the accompanying claims I aim to cover all modifications of the invention which do not depart from the spirit thereof and do not limit myself to the specific arrangement herein described and illustrated.

Having thus described my invention, what I claim as new and desire to secure by Letters Patent is—

1. In a dynamo-electric machine, a rotatable field magnet, a stationary armature having ventilating passage-ways which permit a flow of air from the periphery of the machine through said passageways and out again at the periphery of the machine, in combination with means for confining the air to said passage-ways while flowing through said stationary armature so as to prevent same from entering the air-gap between the rotatable field magnet and the armature, means external to the machine for causing a current of air to flow through said passage-ways, and means carried by the field magnet for forcing an independent current of air through the air-gap.

2. In a dynamo-electric machine, a rotatable member, a stationary member provided with ventilating passage-ways arranged substantially concentrically about the axis of said rotatable member, means for cutting off direct communication between said passage-ways and the air-gap of the machine, means external to the machine for forcing air through said passage-ways, and means for producing an axial ventilation through said air-gap.

3. In a dynamo-electric machine, a stator having passageways through the core thereof, a rotor, means for causing a current of air to flow through the stator core passageways, means for causing a current of air to flow through the air-gap between the stator and rotor, and means for preventing said current of air from entering the stator after it has passed through the air-gap.

4. A dynamo-electric machine having a rotor, a stator surrounding said rotor and provided with ventilating passageways through its core substantially concentric with said rotor, said machine being constructed to permit a ventilating blast of air to flow through the air-gap between the rotor and stator without entering the stator core passageways while flowing through the machine, and means for forcing a blast of air through the air-gap.

5. In a dynamo-electric machine, a stationary member having passageways formed therethrough, a rotatable member, means for supplying a ventilating blast of air to said rotatable member, means for supplying a ventilating blast of air to the passageways of said stationary member, and means for regulating the relative intensities of said blasts.

6. In a dynamo-electric machine, a stationary member having passageways formed therethrough, a rotatable member, means for supplying a ventilating blast of air to said rotatable member, means external to the machine for supplying an independent ventilating blast of air to the passageways of said stationary member, and means for regulating the relative intensities of said blasts.

In testimony whereof I affix my signature, in the presence of two witnesses.

CHARLES E. LORD.

Witnesses:
L. LOWENBERG,
FRED J. KINSEY.